United States Patent [19]

Blakeslee

[11] 4,043,418

[45] Aug. 23, 1977

[54] REVERSE DIRECTION GUIDANCE SYSTEM FOR LIFT TRUCK

[75] Inventor: Thomas R. Blakeslee, Woodside, Calif.

[73] Assignee: Logisticon Inc., Sunnyvale, Calif.

[21] Appl. No.: 644,549

[22] Filed: Dec. 29, 1975

Related U.S. Application Data

[63] Continuation-in-part of Ser. No. 629,491, Nov. 6, 1975.

[51] Int. Cl.² .............................................. B62D 1/28
[52] U.S. Cl. ..................................................... 180/98
[58] Field of Search ................... 180/98; 318/580, 587

[56] References Cited

U.S. PATENT DOCUMENTS

| | | | |
|---|---|---|---|
| 3,628,624 | 12/1971 | Wesener | 180/98 |
| 3,667,564 | 6/1972 | Schnell | 180/98 X |
| 3,757,887 | 9/1973 | Moore | 180/98 |
| 3,948,342 | 4/1976 | Pircher | 180/98 |

Primary Examiner—Joseph F. Peters, Jr.
Assistant Examiner—Terrance L. Siemens
Attorney, Agent, or Firm—Limbach, Limbach & Sutton

[57] ABSTRACT

An automatic guidance device for a self-powered cargo moving vehicle operated by a vehicle-borne sensor which follows a buried, energized wire path and which includes sensor means mounted either between the fixed and steerable axles or in front of the fixed axle of the vehicle for guiding the vehicle when it travels in a direction such that the fixed axle precedes the sensor by effectively generating a position error signal relative to the direction of travel. In one preferred embodiment the sensor includes a pair of sensing coils whose outputs are combined to generate an error signal $V=(1+K)R-KF$ where R and F are the difference of outputs of a pair of rear and forward sensors, respectively, and K is equal to the ratio of the distance of the rear pair of coils to the virtual sense point and the distance between the rear and forward pairs of coils.

10 Claims, 14 Drawing Figures

REVERSE DIRECTION GUIDANCE SYSTEM FOR LIFT TRUCK

CROSS-REFERENCE TO RELATED APPLICATION

This application is a continuation-in-part of my co-pending application Ser. No. 629,491filed Nov. 6, 1975, and entitled GUIDANCE SYSTEM FOR LIFT TRUCK.

BACKGROUND OF THE INVENTION

This invention relates to guidance devices for self-powered vehicles and more particularly to a wire-following guidance device for an order picking vehicle.

In the material handling industry, high-rise order picker vehicles (OPVs) permit narrow aisle storage and retrieval operations of nonpalletized case or item storage. Such OPVs carry an operator on a lifting platform who picks orders from either a pallet or a storage module. The lifting platform incorporates the vehicle control so the operator can ride on the platform. The aisle widths are extremely narrow and may be as narrow as 4 feet. In the applicant's copending application the guidance system allows the operator to select between manual, power steering guidance of the vehicle or automatic guidance of the vehicle. In the automatic guidance mode, the vehicle follows an energized wire which is buried in the floor over which the vehicle travels.

In many self-guided vehicle systems, including the system described in the applicant's copending application referred to above, the vehicle has a pair of wheels on a fixed, that is, nonsteerable axle and a steerable wheel which is usually located in the front of the vehicle with respect to the normal direction of travel. The device for sensing the buried, energized wire then includes at least a pair of coils which straddle the wire and which are mounted on the vehicle ahead of the fixed axle. The purpose in mounting the coils ahead of the fixed axle is to obtain servo stability. If it is desired to move the vehicle in the reverse direction, in order to retain stability, it is then necessary to mount an auxiliary pair of sensor coils on the vehicle in a position such that they precede the fixed, nonsteerable axle when the vehicle travels in the reverse direction. See, for example, U.S. Pat. No. 3,667,564 (Schnell) which described an elaborate mechanism for having two pairs of steerable wheels, one of which is mechanically moved out of position when the vehicle is traveling in the forward direction and which is lowered to the ground and steerable when the vehicle travels in the reverse direction. The normal steerable wheel must be made to be nonrevolvable around its vertical axis. The reverse direction sensor coils are also lowered into and out of position depending on the direction of travel of the vehicle. This mechanism is rather complicated and clumsy. A further problem is that in the event a load is to be carried behind the fixed axle, that is, on the forklift itself, the load when it is lowered to the ground will interfere with the sensor coils positioned underneath the forklift and behind the axle.

SUMMARY OF THE INVENTION

The above disadvantages of the prior art are overcome by the present invention of an improved, self-guided vehicle of the type which automatically follows an externally defined path in a forward direction and which has at least one ground engaging steerable wheel, sensor means mounted on the vehicle for generating a position error signal representative of the position of the vehicle with respect to the path, steering motor means attached to the ground engaging steering wheel for steering the vehicle in response to a steering control signal to the steering motor means, and steering circuit means supplied with the position error signal for generating a first steering control signal for the steering motor means to cause the steering motor means to automatically steer the vehicle along the external path. The improvement of the invention comprises sensor means for generating the position error signal relative to a virtual sense point to the rear of the vehicle to guide the vehicle when it travels in a backward direction along the path.

In the preferred embodiment of the invention the path over which the vehicle travels is defined by a buried, energized wire. The sensor means comprise a pair of forward sensor coils and a pair of reverse sensor coils with each of the pairs of coils being mounted on the vehicle so as to normally straddle the buried wire. Each pair of coils produces an output signal representative of the difference of the outputs of the coils of each pair. The sensor means further include means for generating the position error signal (V) with respect to the virtual sense point according to the formula:

$$V = (1+K)R - KF$$

where
- $R$ = the difference of the outputs of the rear pair of sensor coils;
- $F$ = the difference of the outputs of the forward pair of sensor coils; and
- $K$ = a constant which equals the ratio of the distance of the rear pair of coils to the virtual sense point divided by the distance between the rear and forward pairs of coils.

In a less advantageous embodiment the virtual sense point position error signal is generated by right and left error coils which are mounted on the vehicle on opposite sides of the buried wire together with a direction sensing coil for sensing the angle the vehicle makes with respect to the wire. The direction sensing coil is aligned with the wire so that its output is proportional to the tangent of the angle made with the wire for small angles. The sensor means further includes means for generating the position error signal (V) with respect to the virtual sense point according to the formula $$V = L - R + K\phi$$

where $K$ is a constant determined in part by the maximum output of the direction sensing coil and the distance from the position sensing coils to the virtual sense point, $L$ and $R$, of course, being the outputs of the left and right error coils, respectively. This embodiment is less advantageous because it is overly sensitive to variations in the straightness of the buried wire. A slight wiggle in the wire is greatly magnified and causes a spurious error signal.

It is therefore an object of the present invention to provide a guidance device for a self-powered cargo moving vehicle which allows the vehicle to travel in the reverse direction without the necessity for having sensor coils preceding the fixed axle of the vehicle;

It is another object of the present invention to provide a guidance device for a self-powered vehicle which senses the position and angle of the vehicle with respect to the buried wire and generates a position error signal relative to a virtual sense point which is ahead of the vehicle.

The foregoing and other objectives, features and advantages of the invention will be more readily understood upon consideration of the following detailed description of certain preferred embodiments of the invention, taken in conjunction with the accompanying drawings.

DETAILED DESCRIPTION OF CERTAIN PREFERRED EMBODIMENTS

For convenience in relating this application to the applicant's copending application referred to above, the reference numerals used throughout this application correspond wherever possible to the reference numerals used for the same elements in the applicant's copending application.

Figure 1:
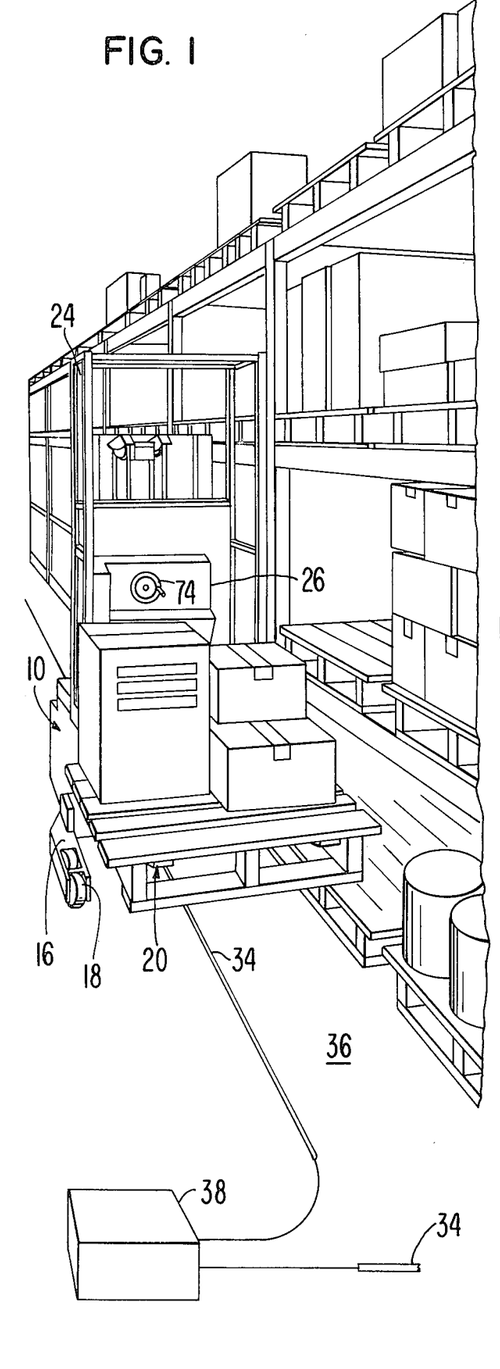
FIG. 1 is a perspective view of an order-picking vehicle equipped with a guidance system according to the present invention.
Figure 2:
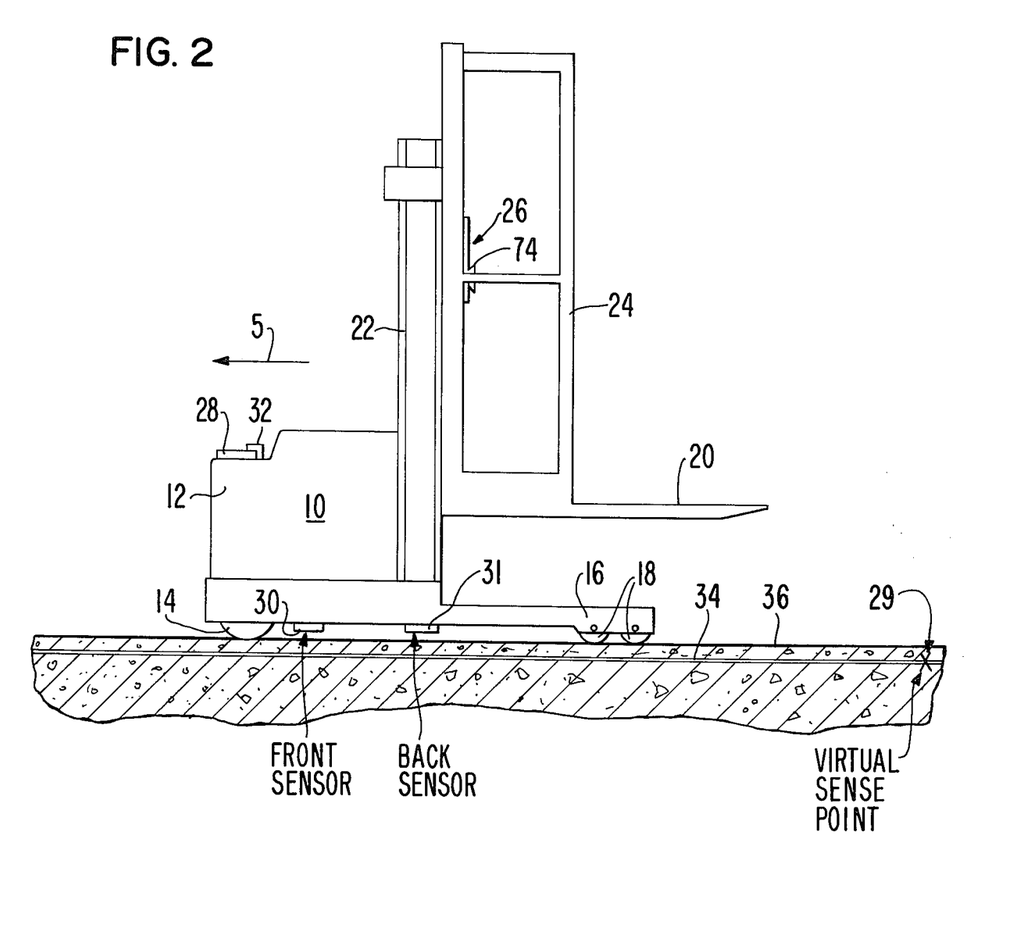
FIG. 2 is a side-elevational view of an order-picking vehicle equipped with the guidance system of the invention.
Figure 3:
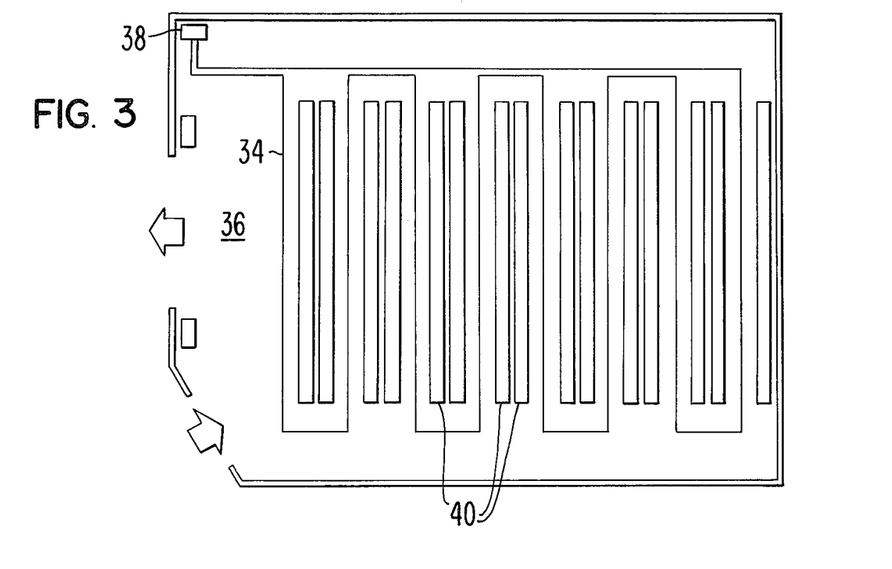
FIG. 3 is a plan view of the buried wire guide path for the order-picking vehicle of the invention.

Referring now more particularly to FIGS. 1, 2 and 3 the basic order-picking vehicle 10 utilized in the guidance system of the invention is of a conventional type. It has a rear portion 12 which houses the motor and storage batteries which drive the order-picking vehicle. As viewed in FIG. 2, the leftmost wheel is a ground-engaging guide wheel 14 which is pivotable in a horizontal plane about a vertical axis and which is driven by the motor within the housing 12. A pair of horizontally spaced apart members 16 extend from the righthand end of the OPV, as viewed in FIG. 2, and each supports a pair of ground-engaging roller wheels 18 on nonpivotable, fixed axles. A forklift assembly 20 is supported on a vertical rack 22 extending above the horizontal members 16. The forklift assembly 20 includes an operator cubicle 24 and a control console 26 mounted within the cubicle 24. A steering mode selector-handwheel 74 allows the operator to manually steer, power steer, or automatically guide the vehicle. The operation of this mechanism is explained in detail in applicant's copending application. The forklift mechanism 20 is raised and lowered on the rack 22 under the operator's control by conventional means which will, therefore, not be described in further detail. The angular alignment of the ground-engaging steering wheel 14 is depicted visually above the OPV 10 by a rotatable indictor 28 on top of the rear housing 12.

The description of the OPV 10 to this point has been of a conventional OPV. To modify the OPV 10 for the guidance system of the present invention, a forward direction or front sensing coil assembly 30 is mounted on the bottom surface of the OPV immediately behind the wheels 14 and along the axis of symmetry of the OPV 10. The normal, forward direction of travel for the vehicle 10 is to the left in FIG. 2, as indicated by the arrow 5. A feedback sensor 32 is mounted on top of the indicator 28 to sense the angular position of the indicator 28. A reverse direction or rear sensing coil assembly 31 is mounted on the bottom surface of the OPV along the OPV's axis of symmetry and between the coil assembly 30 and the fixed axle, nonsteerable wheels 18. The OPV 10, when operating in the automatic guidance mode, straddles a buried wire 34 in the floor 36. The wire 34 is connected to a 6.3 KHz line driver unit 38 which sends high frequency signals along the wire 34. As will be explained in greater detail hereinafter, the OPV 10 when operating in the automatic guidance mode is centered over the wire 34 and the sensing coil assemblies 30 and 31, straddling the wire, pick up the wire signals and feed them to an electronic guidance system. The guidance system, through a motorized unit to be described in greater detail hereinafter, rotates the ground-engaging steering wheel 14 in a manner so as to steer the OPV 10 along the wire 34.

The layout of the wire 34 in a typical installation is depicted in FIG. 3, which shows the wire 34 serpentined through a plurality of storage aisles 40. The OPV 10 is manually power steered, in a manner to be described in greater detail hereinafter, into the storage facility until it approaches the wire 34 at which point the operator switches the guidance mechanism to its automatic mode as it is approaching the wire 34. When the OPV has either passed over the wire 34 and is heading away from it, or has come relatively close to the wire 34 and is heading away from it, the guidance system will electronically lock onto the wire and guide the OPV over the wire 34 and down between the storage aisles 40 until the operator stops the OPV 10.

Figure 4:
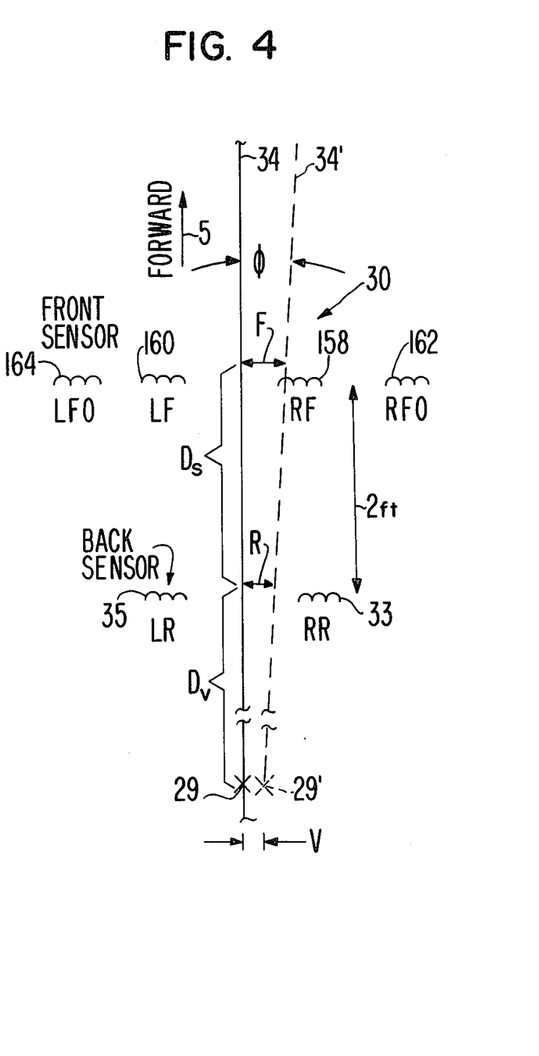
FIG. 4 is a plan, diagrammatic view of the sensor coil arrangment of the embodiment depicted in FIG. 1.
Figures 5, 6:
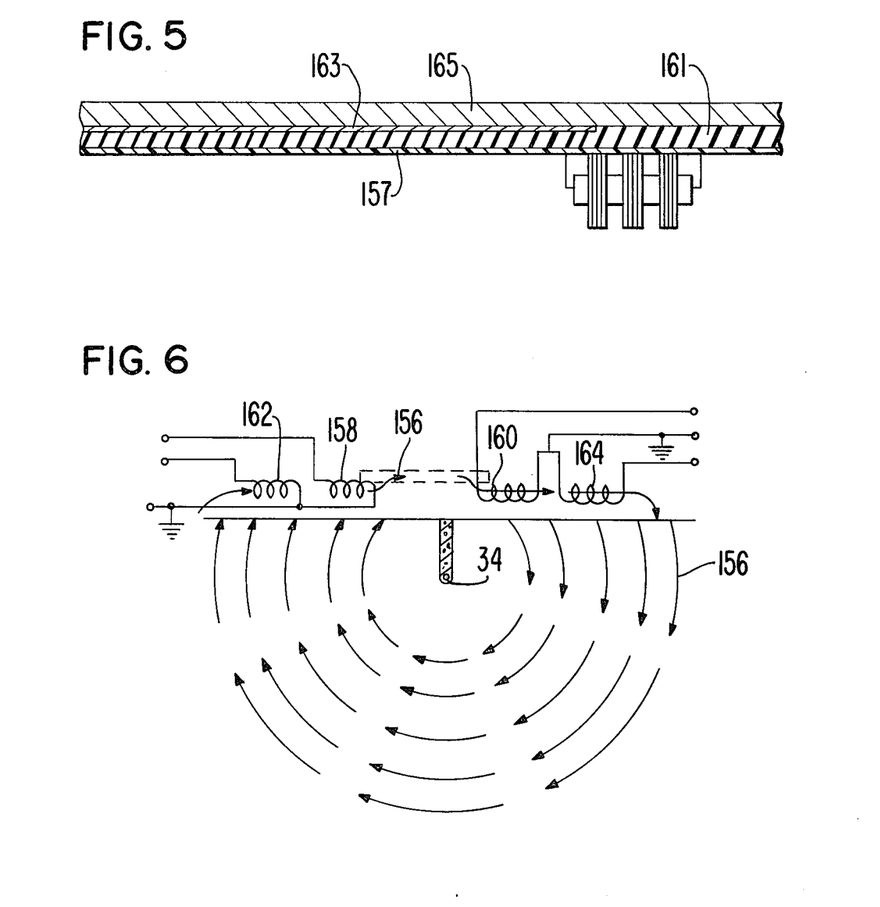
FIG. 5 is an enlarged, vertical view, partly in section and with portions broken away, of one of the sensor coil assemblies of the invention.
FIG. 6 is an enlarged, diagrammatic view of one of the sensor coil arrangements of the invention.

Referring now more particularly to FIGS. 4, 5 and 6, the electronic sensor portion of the guidance device of the present invention will be described in greater detail. The electromagnetic field transmitted by the alternating current traveling through the buried wire 34 is distributed radially along the wire as is illustrated by the magnetic flux lines 156 in FIG. 6. The front magnetic coil sensor assembly 30 carried by the OPV 10 comprises a pair of right and left reference coils 158 and 160 and a pair of right and left error coils 162 and 164, respectively. The terms right and left are taken in FIG. 4 looking in the direction of forward travel as indicated by the arrow 5 in FIG. 6 as though the observer were standing behind the coils and looking toward the direction of travel (left). The reference coils 158 and 160 are spaced apart by approximately 7.5 inches, that is, they are each approximately 3.75 inches horizontally from the buried wire 34. The error coils 162 and 164 are spaced approximately 14.5 inches apart, that is, 7.25 inches horizontally from the buried wire 34. The rear sensor coil assembly 31 is spaced approximately two feed behind the front sensor coil assembly 30 and comprises a pair of right and left sensor coils 33 and 35, respectively, spaced apart approximately 7.5 inches and on opposite sides of the buried wire 34. That is, each coil is approximately 3.75 inches horizontally from the wire. The rear coil assembly is also eight feet forward of a hypothetical virtual sense point 29.

Referring now to FIG. 4, assume that the vehicle deviates from the guide path so that the buried wire is at an angle $\phi$ with respect to the vehicle's axis of symmetry, as indicated by the wire 34' shown in dashed line fashion in FIG. 4. The method by which the guidance circuit of the invention provides an error signal when the vehicle is traveling forward in the direction of the arrow 5 is described in detail both in the applicant's copending application referred to above and hereinafter. If the vehicle is traveling backward, however, then by geometric construction it can be seen that the error (V) in position between the virtual sense points 29 and 29' is determined by the formula:

$$V = R - (F - R)\frac{Dv}{Ds}$$

$$V = (1 + Dv/Ds)R - \frac{Dv}{Ds} F$$

where
$F$ = error at front sensor 30, i.e., difference of outputs of coils 160 and 158;
$R$ = error at rear sensor 31, i.e., difference of outputs of coils 35 and 33;
$Dv$ = distance from rear coil assembly 31 to the virtual sense point 29; and
$Ds$ = distance between the coil assemblies 30 and 31. for example, if the sensors 30 and 31 are spaced 2 feet apart and the virtual sense point must be 10 feet behind the rear sensor 31 the projection ratio is 10/2 = 5 so the virtual sensor signal would be six times the rear sensor signal minus five times the front sensor signal.

Since the error signal is the difference between two large numbers, both sensor characteristics must be very exact. A 5% nonlinearity in the back sensor characteristic, for example, results in a 5 × 5 = 25% nonlinearity in the virtual sensor output. Since variations in sensor slope cause variations in loop gain, a linear sensor characteristic is important if servo stability and accuracy are required. Another problem caused by the high sensor gain is increased sensitivity to noise from the drive motor. A very linear and repeatable sensor with good noise rejection is obtained by constructing the sensor in a rigid sandwich as shown in FIG. 5. The coils, such as coil 158, are all mounted horizontally on a printed circuit board 157 by their leads 159. The coil leads are interconnected by the printed circuit in a manner to be described below. The side of the board 157 opposite to the coils is pressed hard against an assembly of sheets comprised of a sheet of rubber 161, ⅛ inch thick, a 2 inch × 7 inch strip 163 of mu metal which is 0.006 inch thick, and a ⅛ inch thick strip 165 of cold rolled steel. The mu metal strip 163 ends near the inside end of the sensor coil and provides a low reluctance, horizontal return path for the lines of flux 156 from the guide wire 34. This increases sensor output and reduces response to noise from the vehicle drive motor. The mu metal also linearizes the sensor characteristic and reduces variations in sensor characteristic caused by steel truck components. This is very important as distortions of the magnetic field from the wire due to steel truck components are not matched front to back. The resulting unmatched nonlinearilities in sensor characteristics could cause greatly magnified nonlinearities in the resulting virtual sensor characteristic. It also makes it possible to have a very thin sensor package. In one embodiment the sensor coils are 50 mHy. R.F. choke coils. It should be understood that this same construction is used for both of the sensor assemblies 30 and 31.

Figures 7A, 7B:
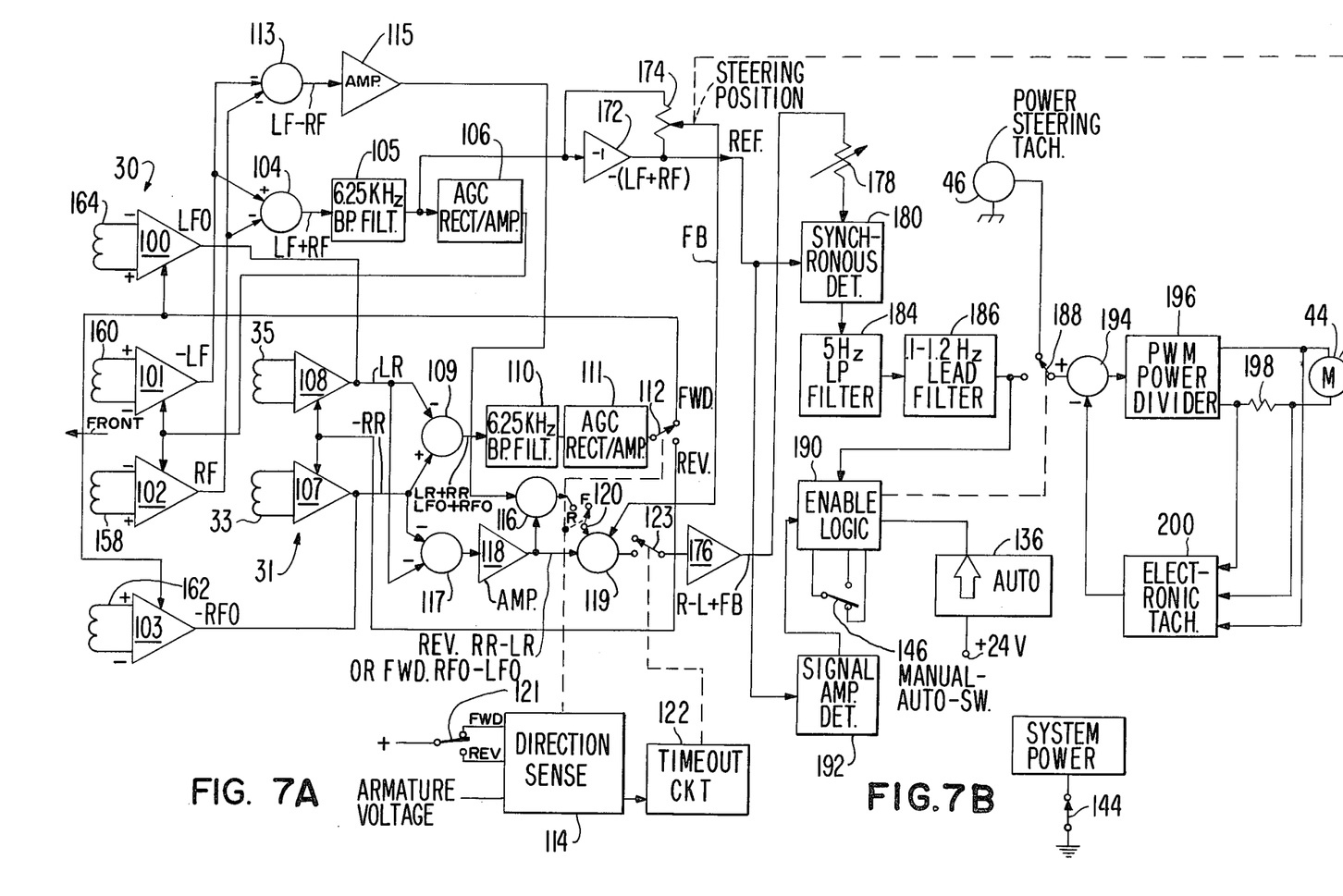
FIGS. 7A and 7B together are a schematic block diagram of the electronic guidance system of the invention.

Referring now more particularly to FIGS. 7A and 7B the operation of the guidance system of the invention will be described in greater detail. The oppositely phased outputs RF and −LF from the right and left reference coils 158 and 160, respectively, are fed through separate variable gain transconductance amplifiers 102 and 101, respectively, are fed to the minus and plus inputs of a summing junction 104, respectively. The resultant output LF+RF from the summing junction 104 is fed through a 6.25 kHz band pass filter 105 to the input of an automatic gain control rectifier/amplifier 106. The output from the AGC rectifier/amplifier 106 is supplied to the DC gain control inputs to the variable gain transconductance amplifiers 101 and 102. The output of the amplifiers 101 and 102 is in proportion to the DC gain control current input. The result of this loop circuit is to adjust the gain of the amplifiers 101 and 102 to keep the sum of the left and right reference coils outputs (as seen at the output of the band pass filter 105) constant. The difference between the left and right reference sensor coil outputs is thus made less sensitive to distance to the buried wire 34 and is also made more linear. In a similar fashion the oppositely phased outputs −RR and LR from the rear right and left sensor coils 33 and 35, respectively, are supplied through variable gain transconductance amplifiers 107 and 108, respectively, to the plus and minus inputs of a summing junction 109, respectively. The resulting output LR+RR from the summing junction 109 is fed through a 6.25 kHz band pass filter 110 to the input of an automatic gain control rectifier/amplifier 111. The DC output from the AGC rectifier/amplifier 111 is fed to the moving "contact arm" of a single pole, double throw electronic switch 112. The switch 112 is operated by a vehicle direction sensor logic circuit 114. When the vehicle is moving in the reverse direction the equivalent of the contact arm 112 is connected to supply the output of the automatic gain control rectifier/amplifier 111 to the DC gain control input to the transconductance amplifiers 107 and 108. When the vehicle is moving in the forward direction the output from the automatic gain control rectifier/amplifier is supplied to the variable gain control inputs to a pair of transconductance amplifiers 100 and 103. The amplifier 100 is supplied with the output from the left error coil 164 and the amplifier 103 is supplied with the output from the right error coil 162. The respective outputs LFO and −RFO from the amplifiers 100 and 103 are also supplied to the minus and plus inputs of the summing junction 109. Since when the switch 112 is in the forward mode the amplifiers 107 and 108 receive no DC gain control current, they are effectively turned off and only the LFO and −RFO signals are supplied to the summing junction 109. Conversely, when the switch 112 is in the reverse mode the amplifiers 100 and 103 receive no DC gain control signals and are effectively shut off so that only the LR and −RR signals are supplied to the summing junction 109. As in the case of the amplifiers 101 and 102, the purpose of the loop involving the band pass filter 110 and the automatic gain control rectifier/amplifier 111 is to adjust the gains at the respective amplifiers to keep the sum of the left and right sensor coils signals supplied to the summing junction 109 (as seen at the output of the band pass filter 110) constant.

The RF and −LF outputs of the amplifiers 102 and 101, respectively, are also supplied to the inputs of a subtraction junction 113 whose output, LF−RF, is supplied to the input of a transconductance amplifier 115. The output of the transconductance amplifier 115 is supplied to a summing junction 116. The summing junction 116 has the property that its output is five times the value of its inputs.

The minus and plus inputs to the summing junction 109 are also supplied to a second subtraction junction 117 whose output is supplied to a transconductance amplifier 118. The output of the transconductance amplifier 118, which in the reverse mode is RR−LR and which in the forward mode is RFO−LFO, is also supplied to one of the inputs of the summing junction 116. The output of the amplifier 118 is also supplied to another summing junction 119. Another input to the summing junction 119 is an electronic, CMOS switch 120 connected to the output of the summing junction 116. The switch is closed in the reverse mode and is open in the forward mode.

Thus in the reverse direction mode the output of the summing junction 119 is six times the rear sensor signal minus five times the front sensor signal for a projection distance to the virtual sense point of five times the spacing between the sensor assemblies 30 and 31. The differencing is obtained by adding LF−RF to the signal RR−LR which is the equivalent of subtracting RF−LF from the signal RR−LR. Trimpot adjustments are provided to allow for the elimination of variations in the sensor coil output and circuit gains. In the forward direction mode the signal RFO−LFO corresponding to the difference of the right and left error coils 103 and 100 is supplied at the output of the summing junction 119. The filtered sum of the right and left reference coil signals RF and LF is used as a reference signal for a synchronous detector 180 to be described in greater detail hereinafter.

The direction of the vehicle is determined from the armature voltage of the driving motor and the forward and reverse switches, symbolized by switch 121, in the motor control. See also FIG. 13. When the vehicle direction command is reversed, inertia causes the vehicle to continue moving in the same direction for some time. During this time the armature voltage will be reversed. Actual vehicle direction is thus sensed by setting a logic latching circuit 124 to the direction commanded by the control switch 121 only when the armature voltage is not reversed. This is sensed by the direction sense logic circuit 114 whose output is true when the vehicle is going in the direction which has been commanded.

To prevent unnecessary power consumption by the vehicle steering motor when the vehicle is stopped, a time-out circuit 122 operating under the control of the direction sense logic circuit 114 enables the steering control signal via an electronic, CMOS switch 123 only when the armature voltage indicates that the vehicle is moving. This circuit turns on rather quickly, but only turns the guidance circuit off after a 15 second delay.

The output of the band pass filter 105 is supplied to the input of an inverting amplifier 172 and to one arm of a potentiometer 174. The output of the amplifier 172 is labeled "−(LF+RF)" and is fed to the other arm of the potentiometer 174. The movable contact of the potentiometer 174 is mechanically connected to the ground engaging steering wheel 14 as represented by the dashed line to the motor 44. Thus the angular orientation of the ground engaging steering wheel 14 is reflected in the position of the movable contact arm of the potentiometer 174. The potentiometer 174 together with the mechanical linkage indicated in dashed line form as being connected to the motor 44 actually represents the sensor 32 mounted on the indicator 28 on the back of the OPV housing 12 as shown in FIGS. 1 and 2.

If the ground engaging steering wheel 14 is turned to the right as far as it will go the movable contact arm of the potentiometer 174 will be moved to the position where it receives the signal −(LF+RF). If the ground engaging steering wheel is turned as far as it will turn to the left the movable contact arm of the potentiometer 174 will be at the opposite end to receive the signal (LF+RF). The signal output from the movable contact arm is labeled FB, because it is a negative feedback signal, and this signal FB is added at the summing junction 119. The output of the summing junction is thus "R−L+FB" where R−L is 6(RR−LR)−5(RF−LF) in the reverse direction mode and is RFO−LFO in the forward direction mode. This signal is supplied to the input of an operational amplifier 176.

The amplifier signal R−L+FB from the output of the amplifier 176 is fed through a loop gain variable resistance 178 to one input of a synchronous detector 180. The amplified reference signal −(LF+RF) from the output of the amplifier 172 is fed to another input of the synchronous detector 180. The synchronous detector detects signals which are coherent to the reference signal, that is when the reference signal is less than 180° out of phase with the error signal the synchronous detector integrates the error signal R−L+FB. When the reference signal is more than 180° out of phase with the error signal the synchronous detector inverts and integrates the error signal R−L+FB. In this way spurious noise signals are averaged out to nothing. The output from the synchronous detector 180 is a DC signal whose magnitude is representative of the position error of the OPV 10 and whose polarity indicates on which side of the wire the OPV 10 is positioned. This output is fed through a 5 Hz low pass filter 184 to filter out any high frequency pulses and the output of the filter 184 is fed to a 0.1–1.2 Hz lead filter whih introduces an approximately 60° lead in phase to prevent oscillation in the feedback loop. The output from the lead filter 186 is fed to one terminal of a single pole double throw electronic switch 188.

The other terminal of the switch 188 is connected to the power steering tachometer 46 which is rotated by the handwheel 74. The output of the lead filter 186 is also supplied to an enable logic circuit 190. Another input to the enable logic circuit 190 is from the output of a signal amplitude detector 192 whose input is supplied from the inverting amplifier 172.

The purpose of the enable logic circuit 190 is to determine when the guidance system has "acquired" the buried wire 34. The output of the signal amplitude detector 192 represents a threshold signal which is simply an amplified version of the reference signal −(LF+RF). This threshold signal together with the signal from the lead filter 186 allows the enable logic circuit 190 to detect whether the signal is strong enough to guide the circuit and, from the signs of the slope and the polarity of the error signal, whether or not the OPV 10 has either crossed over the wire and is heading away from it or has closely approached the wire and is heading away from it.

Figure 10:
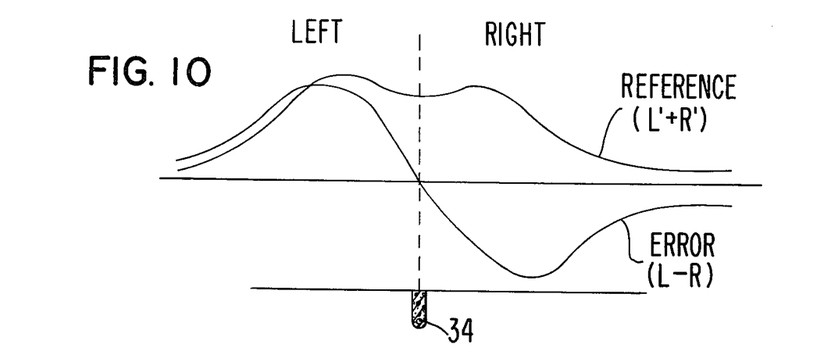
FIG. 10 is a waveform diagram of the forward sensor coil outputs of the guidance system depicted in FIGS. 7A and 7B.

Referring more particularly to FIG. 10 a waveform graph of the reference signal −(LF+RF) and the error signal R−L is depicted with respect to the buried wire 34. As is readily apparent from the figure the reference signal has a slight dip in amplitude when the OPV 10 is centered over the buried wire 34. The error signal undergoes a zero crossing when the OPV 10 is centered over the wire 34. When the error signal and the reference signal lie on the same side of the abcissa they are in phase and when the error signal is on the opposite side of the abcissa the error and reference signals are out of phase. At the point where the OPV 10 is about to cross the wire the polarity of the output of the synchronous detector is changing from one polarity to another and the slope of the error signal is approaching zero. It is in this condition which triggers the enable logic circuit 190 to activate the electronic switch 188 to connect the output of the lead filter 186 to the plus input of asumming junction 194. Until this condition is reached, the enable logic circuit 190 connects the power steering tachometer to the plug input of the summing junction 194. The manual-auto mode switch 146 is also connected to the enable logic circuit 190, thereby allowing the operator to manually cause the switch 188 to connect the power steering tachometer 46 to the summing junction 194 when the handwheel 74 is in its intermediate position. The enable logic circuit 190 also lights the "Auto" light 136 when the switch 198 is in the position connecting the lead filter 186 to the summing junction 194.

The output of the summing junction 194 goes to a pulse width modulated power driver circuit 196. The output of the power driver 196 is a series of pulses whose width is proportional to the magnitude of the error signal and whose polarity corresponds to the polarity of the output signal from the synchronous detector 180, that is the polarity is dependent upon which side of the buried wire 34 the OPV 10 is standing. One output lead from the power driver 196 is fed directly to the motor 44. The other output lead is fed to the motor 44 through a low resistance 198. An electronic tachometer 200 has three inputs which are connected to the output of the power driver 196 and the motor 44 so as to be able to sense both the voltage drop across the motor 44 and the voltage drop across the resistance 198. The motor 44 in effect acts like a generator. By knowing how much of the voltage drop across the motor is due to resistance losses in the armature it is possible by sensing the current through the motor, as represented by the voltage drop across the resistor 198, to calculate the true back EMF generated by the motor 44. This information is calculated in the electronic tachometer in analog fashion to produce a feedback signal which is subtracted at the junction 194. This negative feedback signal provides a damping to prevent the motor from oscillating due to overshoot which might otherwise occur because of the major negative feedback loop through the potentiometer 174.

Figure 8:
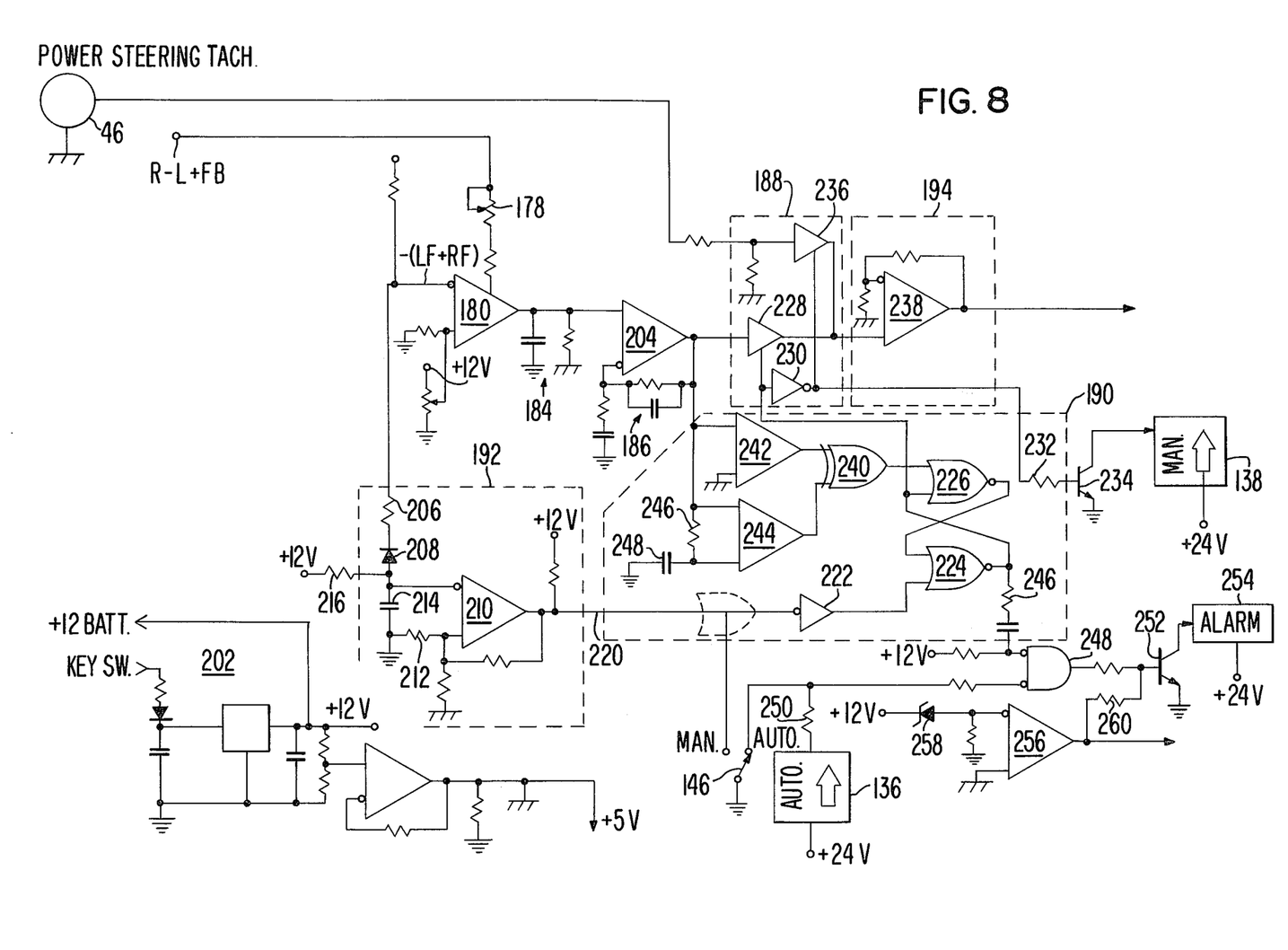
FIGS. 8 and 9 are, together, a detailed schematic diagram of portions of the circuit depicted in block diagram form in FIGS. 7A and 7B.
Figure 9:
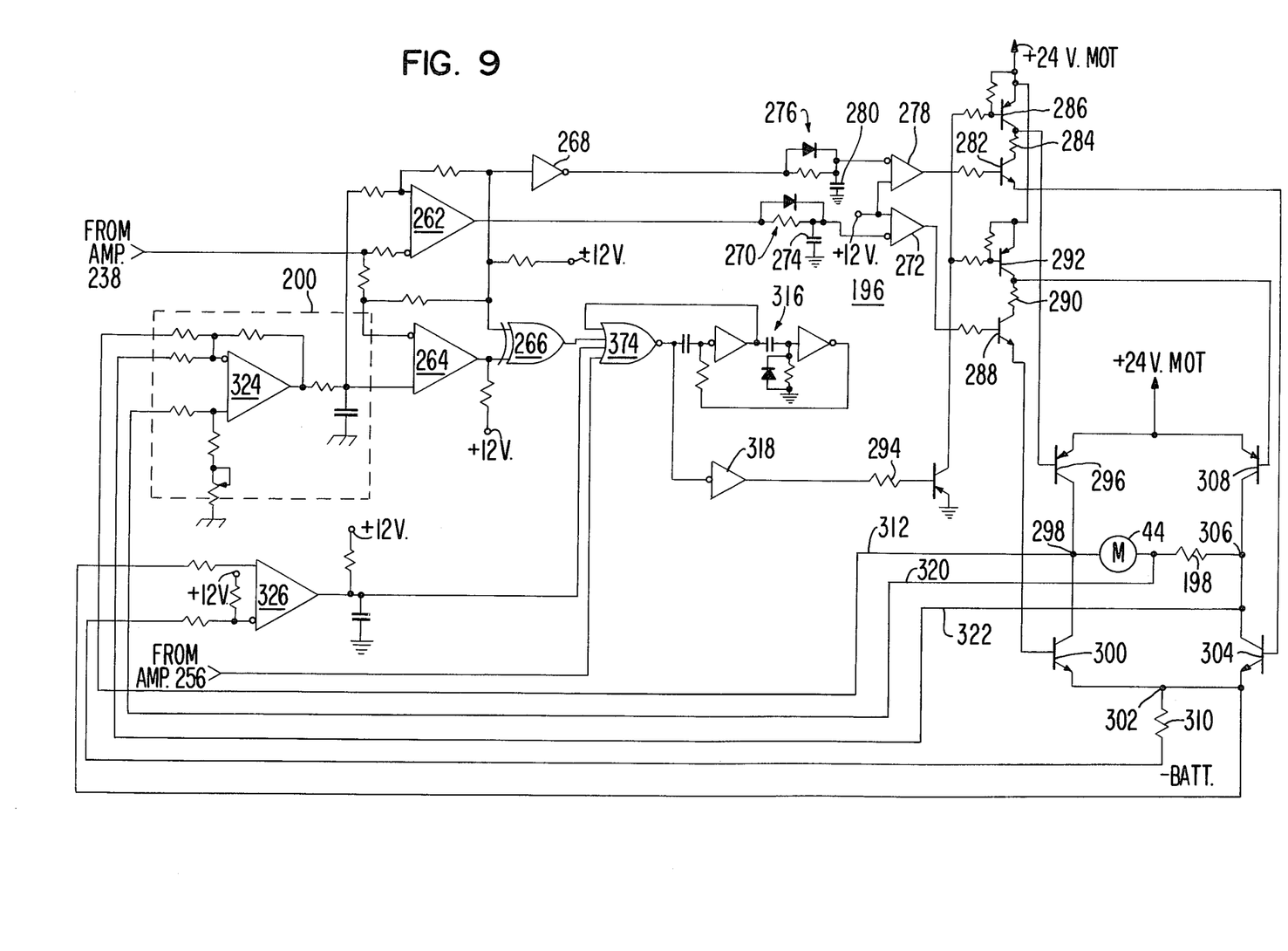

Referring now more particularly to FIGS. 8 and 9, a more detailed description will be given of the circuit depicted in FIGS. 7A and 7B. The same components depicted in FIGS. 7A and 7B have been encircled with dashed lines and are referred to by the same reference numbers. The −(LF+RF) reference signal is fed to one input of a differential amplifier 180 arranged in the circuit to act as the synchronous detector. The output of the synchronous detector 180 is fed to a low pass 5 Hz filter 184 comprised of a capacitor connected between the output of the synchronous detector 180 and the circuit ground and a resistor connected between the output of the synchronous detector 180 and the signal ground. It should be noted that some of the components in the circuit to be described are connected to the circuit ground while others are connected to the signal ground. The reason for this is, as will be observed in the lower portion of FIG. 8, that the power supply designated generally as 202 has a plus 12 volt output with respect to the circuit ground and a plus 7 volt output connected to the signal ground.

The output of the lowpass filter 184 is supplied to one input of a differential amplifier 204 whose other input is supplied with the output of the lead filter 186 comprised of a parallel RC circuit connected in feedback configuration to the amplifier 204.

The output of the differential amplifier circuit 170 is also supplied to the signal amplitude detector 192 which is comprised of an input resistance 206 connected to the cathode of a diode 208 whose anode is connected to the input of a differential amplifier 210. The other input of the amplifier 210 is connected through a resistance 212 to the circuit ground and through a capacitor 214 to the anode of the diode 208. Plus 12 volts bias is supplied through a resistor 216 to the anode of the diode 208. The output signal from the amplifier 210 may be designated as the threshold signal and it is supplied via a line 220 to the enable logic circuit 190. The "MAN." terminal of the single pole double throw switch 146 is connected to the line 220. The contact arm of the switch 146 is connected to the circuit ground. Thus when the switch 146 is in the "MAN." position the line 220 is grounded and no threshold signal is supplied to the enable logic circuit 192 just as if no threshold signal has been produced. Both of these conditions will be designated for the purposes of this discussion as a logic low.

The line 220 is connected to the input of an inverter 222 whose output is fed to one input of a NOR gate 224. The output of the NOR gate is fed to one input of a second NOR gate 226 and to the controlling input of a CMOS switch 228 and the input of an inverter 230. The other input of the NOR gate 224 is the output of the NOR gate 226. The output of the inverter 230 is connected through a resistance 232 to the base of an NPN transistor 234. The emitter electrode of the transistor 234 is connected to the circuit ground. The LED 138 is connected in series between the plus 24 volt supply and the collector of the transistor 234.

The output of the inverter 230 is also connected to the controlling input of a second CMOS switch 236 whose input is supplied with the output of the power steering tachometer 46. The outputs of the CMOS switches 228 and 236 are combined and fed to one input of a differential amplifier 238.

The other input of the NOR gate 226 is supplied from the output of an exclusive OR gate 240. As will be explained in greater detail hereinafter, the output of the OR gate 240 is a signal representative of whether or not the signs of the slope and polarity of the error signal after synchronous detection are the same to "enable" the logic, i.e. to make the guidance system acquire the buried wire 34.

As was stated before, when the switch 146 is in the manual mode or when no threshold signal is present on the line 220, a logic high is placed on the corresponding input to the NOR gate 224. When this happens the NOR gates 224 and 226 act as a flip-flop in which the high input from the inverter 222 to the NOR gate 224 is an overriding reset. The result is that the output of the NOR gate 224 will be a logic low and the output of the NOR gate 226 will be a logic high regardless of the output of the exclusive OR gate 240. The logic low apearing at the output of the NOR gate 224 will cause the transistor 234 to become conductive to energize the LED 138. This same logic low will also cause the CMOS switch 228 to be open and, because of the inverter 230, the CMOS switch 236 will be closed.

With the CMOS switch 228 open and the CMOS switch 236 closed the output from the power steering tachometer 46 will be fed to the input of the differential amplifier 238. The output of the amplifier 238 may be taken as the velocity command or, in effect the steering control signal to the motor. The polarity of the signal will determine which way the motor control rotates.

If the switch 146 is switched to the auto position, as shown in FIG. 8, and a threshold signal appears on the line 220, the output of the inverter 222 will be a logic low. Assuming that the output from the exclusive OR gate 240 is also a logic low, indicating that the sign of the slope is not equal to the sign of the polarity of the synchronously detected error signal, and that the output of the NOR gate 224 continues to be a logic low, then the output of the NOR gate 226 will be a logic high. At this point, even though the switch 146 is at "AUTO," the OPV 10 will continue under the power steering mode until the signs of the slope and polarity of the modified error signal are equal. When this happens the output of the exclusive OR gate 240 will be a logic high, causing the output of the NOR gate 226 to be a logic low. With two logic lows to the input of the NOR gate 224 its output will change to a logic high and latch the flip flop.

A logic high at the output of the NOR gate 224 will cause the CMOS switch 228 to become conductive and the CMOS switch 236 to become non-conductive. The LED 138 supplied from the output of the inverter 230 will also be extinguished. Thus the input signal to the amplifier 238 will be the guidance control input derived from the sensing coils and the OPV 10 will be steered automatically.

In order to determine the polarity and slope of the error signal the output of the amplifier 204 is fed to one input of an amplifier 242 whose other input is connected to the chassis ground and whose output is fed to one input of the exclusive OR gate 240. The output from the amplifier 204 is also fed to one input of a differential amplifier 244 and, through a resistor 246 to the other input of the differential amplifier 244. This other input is also connected to the circuit ground through a capacitor 248. The output of the amplifier 244 is supplied to the other input of the exclusive OR gate 240. The output of the amplifier 242 is representative of the polarity of the output of the amplifier 204 and the output of the amplifier 244 is representative of the slope of the same signal. When the OPV 10 has come sufficiently close to the buried wire 34 for the threshold signal to be established at the output of the amplifier 210 then the two amplifiers 242 and 244 together with the exclusive OR gate 240 will determine whether the sign of the slope of the error signal is equal to the sign of its polarity, indicating that the OPV 10 is goind away from the wire. When this happens the output of the exclusive OR gate 240 will be a logic high.

It should be noted that the guide flip-flop made up of the NOR gates 224 and 226 is effectively a latching flip-flop. Once the flip-flop 224 has gone into the auto mode, it will only reset on a change in state of the signal applied from the output of the inverter 222, which indicates either that the switch 146 has been thrown to the manual mode or that the threshold signal has been lost. Provided the threshold signal is present and the switch 146 is in the auto position, no changes at the output of the exclusive OR gate 240 will affect the state of the flip-flop.

In order to warn the operator that the guide flip-flop has changed state, such as if the threshold signal should somehow be lost, the output from the NOR gate 224 is fed through a series RC circuit 246 to one input of a low true NAND gate 248. This same input of the NAND gate 248 is also supplied with appropriate plus 12 volt bias. The other input of the NAND gate is connected directly to the auto terminal of the switch 146 and through a resistance 250 to the LED 136. The output of the NAND gate 248 is supplied to the base electrode of an NPN transistor 252 whose emitter electrode is connected to the circuit ground and whose collector electrode is connected in series with an alarm 254 to a plus 24 volt source.

In operation, the input to the NAND gate 248 supplied by the switch 146 is a logic low. When the output of the NOR gate 224 also goes to a logic low, indicating that the guide flip-flop has somehow reset itself, then the output of the NAND gate 248 will become a logic high, triggering the alarm 254 through the transistor 252. An amplifier 256 having one lead connected through a diode 258 to the plus 12 volt source and its output connected through a resistance 260 to the base electrode of the transistor 252 will activate the alarm 254 if there is a power failure.

Referring more particularly now to FIG. 9, the velocity command output signal from the amplifier 238 is fed to one input of a comparator 262 and to the corresponding input of a second comparator 264. The output of the amplifier 262 is fed to one input of an exclusive OR gate 266, the input of an inverter 268 and through a parallel diode resistance circuit 270 to one input of an amplifier 272. The same input of the amplifier 272 is connected through a capacitor 274 to the circuit ground. The output of the inverter 268 is connected through a similar parallel diode resistance circuit 276 to one input of an amplifier 278. This same input of the amplifier is connected through a capacitor 280 to the circuit ground. The other inputs of the amplifier 272 and 278 are connected to a plus 12 volt source.

The output of the amplifier 278 is connected to the base electrode of an NPN transistor 282 whose collector electrode is connected through a resistance 284 to the collector electrode of a PNP transistor 286. The emitter electrode of the transistor 286 is connected directly to the plus 24 volt source for the motor. The base electrode of the transistor 286 is forwardly biased through appropriate resistances from the plus 24 volt source.

The output from the amplifier 272 is connected to the base electrode of an NPN transistor 288 whose collector electrode is connected through a resistance 290 to the collector electrode of a PNP transistor 292. The emitter electrode of the transistor 292 is connected directly to the plus 24 volt motor source and its base electrode is forwardly biased by appropriate resistance from the plus 24 volt source. The base electrodes of the transistors 286 and 292 are also connected to the collector electrode of an NPN transistor 294 whose emitter electrode is connected to the circuit ground.

To control the direction of the current supply to the motor 44 the collector electrode of the transistor 286 is connected to the base electrode of a PNP transistor 296 whose emitter electrode is connected to the plus 24 volt motor source. The collector electrode of the transistor 296 is connected to a junction point 298 and to the collector electrode of an NPN transistor 300. The base and emitter electrodes of the transistor 300 are connected to the collector of the transistor 288 and to a junction point 302, respectively. The emitter electrode of the transistor 282 is connected to the base electrode of an NPN transistor 304 whose emitter electrode is connected to the point 302 and whose collector electrode is connected to a junction point 306.

The collector electrode of the transistor 292 is connected to the base electrode of a PNP transistor 308 whose emitter electrode is connected to the plus 24 volt battery source for the motor. The collector electrode of the transistor 308 is connected to the junction point 306. The point 302 is connected in series with a very low resistance wire 310 to the minus terminal of the motor battery. The motor 44 is connected at one side to the junction point 298 and through the resistor 198 to the junction point 306.

The output of the exclusive OR gate 266 is fed to one input of a NOR gate 314. The output of the NOR gate 314 is supplied to a combination of inverters and operational amplifiers designated generally as 316 which convert the NOR gate 314 into a 200 microsecond, one shot multi-vibrator. The output of the NOR gate 314, which is effectively the output of the multi-vibrator, is fed through an inverter 318 to the base electrode of the NPN transistor 294.

If any of the inputs to the NOR gate 314 is a logic high its output is a logic low and the transistor 294 will be conductive to forwardly bias the transistors 286 and 292. When the transistors 286 and 292 are forwardly biased, i.e. conductive, they short together the base and emitter electrodes of the transistors 296 and 308, respectively, making them non-conductive so that the motor will now run. As long as all the inputs to the NOR gate 314 are logic lows, its output will be a logic high and the transistors 286 and 292 will be non-conductive.

Assuming that the output of the amplifier 262 is a logic high, the output of the amplifier 272 will cause the transistor 288 to become conductive thereby making the PNP transistor 308 and the NPN transistor 300 conductive by connecting their base electrodes together through the resistor 290, which can have a value of 600 ohms, for example. It can be seen that this causes a current path to flow from the 24 volt battery source through the transistor 308, the resistor 198, the motor 44, the transistor 300 and the resistor 310 to the minus terminal of the battery. Thus the motor will run in a preordained direction determined by the path of current flow. Similarly, when the output of the amplifier 262 is the equivalent of a logic low, these same transistors will be turned off and, through the inverter 268 and the amplifier 278, the transistors 282, 304 and 296 will become conductive to supply current to the motor 44, though in the opposite direction to cause the motor to rotate in the opposite direction. Thus, the polarity of the output of the amplifier 262 is determinative of the direction in which the motor will run. As will be described in greater detail hereinafter, the polarity of the output signal from the amplifier 262 depends on the polarity of the velocity command signal from the amplifier 238 as well as the output of the electronic tachometer 200.

As explained above in reference to FIGS. 7A and 7B, the electronic tachometer 200 is connected in parallel with the motor and across the resistance 198. As shown in FIG. 9, these connections are made by way of lines 312, 320 and 322 connected to points 298, the junction of the motor and the resistor 198, and the point 306, respectively. The lines 312, 320 and 322 are the three inputs to the electronic tachometer 200, which is comprised of a differential amplifier 324 whose inputs are supplied by the lines connected to the motor and whose output is connected to the inputs of the amplifiers 262 and 264 other than the inputs connected to the output of the amplifier 238. As mentioned above, the outputs of the amplifiers 262 and 264 are supplied to the inputs of an exclusive OR gate 266. The exclusive OR gate acts as a controlled inverter whose output will be low whenever the absolute magnitude of the velocity command signal exceeds the absolute magnitude of the tachometer output signal, provided that the two signals are of the same polarity. If the two signals are of opposite polarity, then the output of the OR gate 266 will be low. For any other condition the output of the OR gate 266 will be a logic high with the result that the motor 44 will be turned off. The minimum time during which the motor 44 will be turned off is approximately 200 microseconds, which is determined by the circuit values within the multi-vibrator circuit 316. The duration during which the motor 44 will be turned on is determined by the length of time required for the output signal from the electronic tachometer 200 to match the velocity command signal from the amplifier 238. In order to guard against the possibility that a pair of series connected power transistors such as transistors 296 and 300 or 308 and 304 might be simultaneously made conducting, the parallel resistor diode circuits 276 and 270 together with their associated capacitors 280 and 274 insure that when there is a change in polarity of the velocity command signal that all the power transistors will be turned off before any other set is turned on.

A differential amplifier 326 has its two inputs connected in parallel with the resistor 310 to act as a torque limiting sensor to shut off the motor in the event that, because of some physical binding in the guide wheel mechanism, the motor is forced to draw an excess of current which would damage the motor. When the voltage across the resistor 310 increases beyond a predetermined value the output of the amplifier 326 reaches what amounts to a logic high which is fed to one input at the NOR gate 314. This logic high will cause the motor to be deenergized. Similarly, the power failure signal from the output of the amplifier 256 is also supplied to one input of the NOR gate 314 to shut off the motor in the event there is a failure in power to the guidance circuit.

Figures 11, 12, 13:
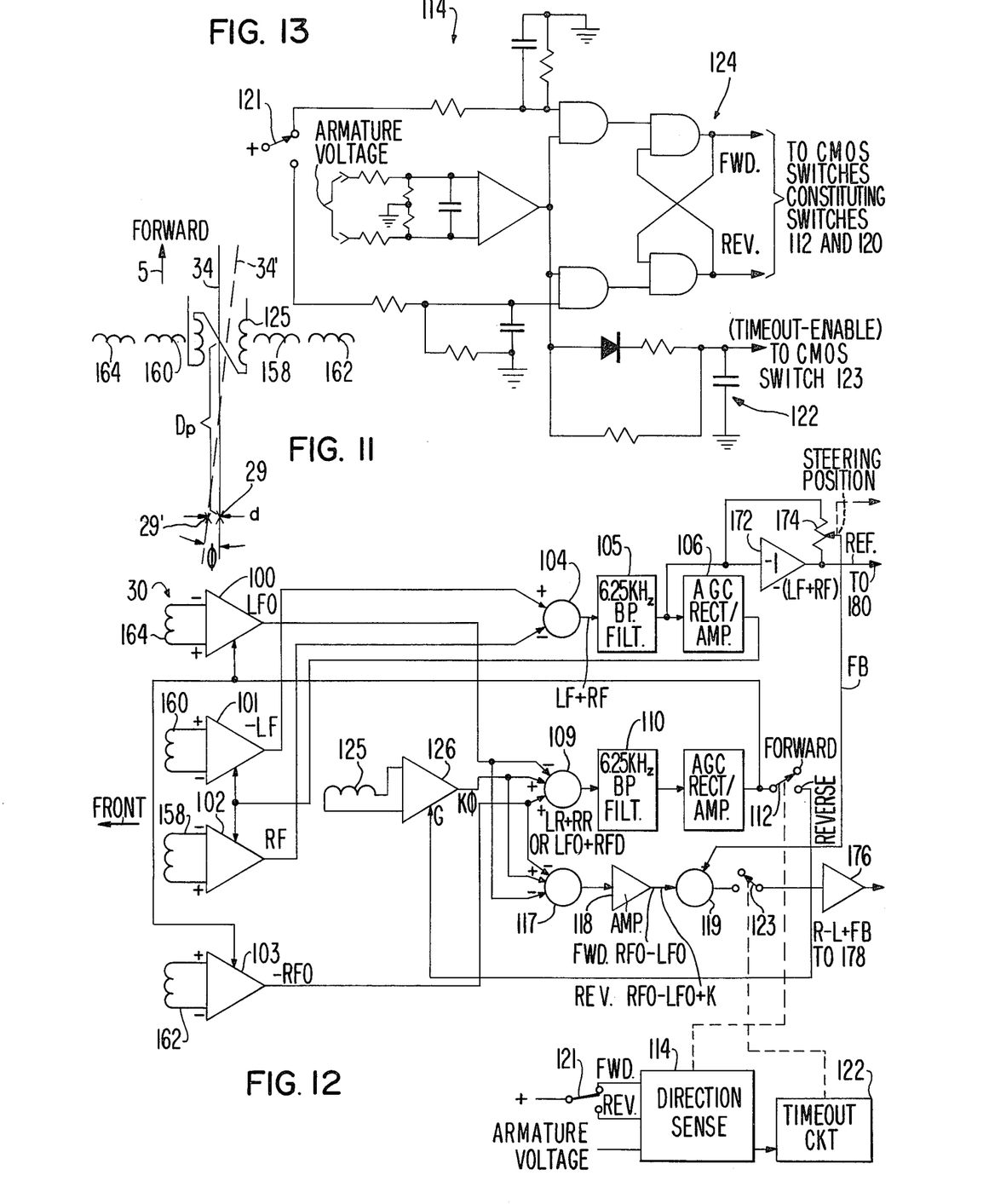
FIG. 11 is a plan view of an alternative coil arrangement of a second embodiment according to the invention.
FIG. 12 is a circuit diagram of a modification of the circuit depicted in block diagram form in FIG. 7 to accommodate the second embodiment of the invention.
FIG. 13 is a detailed schematic diagram of the direction sensing logic portion of the circuit depicted in FIGS. 7A and 7B.

Referring now more particularly to FIGS. 11 and 12, a modified embodiment of the reverse guidance system according to the invention is illustrated. In this embodiment there are no rear sensing coils, but instead there is a single angle sensing coil 125 which is positioned more or less between the right and left reference coils 158 and 160, respectively. The direction sensing coil 125 may take the form of a long ferrite coil not unsimilar to the type which is sometimes used as an antenna coil in portable radios or portable radio direction finders. The coil 125 is positioned on the bottom of the vehicle to be normally directly over the buried wire 34. Assuming that the vehicle is positioned correctly over the wire 34 but is heading in a direction at an angle $\phi$ to the wire, the output of the coil 125 will be A sine $\phi$, where A is the maximum amplitude of the coil output. It will be appreciated that for very small angles of $\phi$ the sine of $\phi$ will approximately equal the tangent of $\phi$.

If it is desired to steer the vehicle with respect to a virtual sense point 29' spaced to the rear of the vehicle and beyond the fixed axle wheels when the vehicle makes an angle $\phi$ with the wire 34 this virtual sense point will be displaced off of the wire by a distance $d$. If the virtual sense point is at a distance $D_p$ from the center of the coil 125, by geometric construction the error d is equal to approximately $D_p$ sine $\phi$, or $$\frac{D_p'}{A} \cdot A \sin\theta = d$$

Since A sin$\phi$ is simply the output of the coil 125 and since ($D_p$/A) is a constant, the error signal can be rewritten as K$\phi$ where $\phi$ is the output of the coil 125. Added to this must be the normal, positional error signals from the coils 162 and 164 which indicate how far away the vehicle is from the buried wire 34. Thus the final error signal is R−L+K$\phi$ where R and L are the outputs from the error coils 162 and 164.

Referring now more particularly to FIG. 12, the circuit depicted in FIG. 7A is modified so that the circuit elements 107, 108, 113, 115, 116 and 120 are omitted. Furthermore the gain control signal for the amplifiers 100 and 103 is taken directly from the output of the AGC rectifier/amplifier 111 rather than from the terminal of the switch 112. The output of the direction sensing coil 125 is fed to the inputs of a transconductance amplifier 126 whose output is connected to the plus input terminal of the summing junction 109 and to the plus input terminal of the summing junction 117. Thus it can be appreciated that when the switch 112 is in the forward direction mode, the output from the amplifier 118 will be RFO−LFO and when the switch 112 is in the reverse direction mode, thus supplying a gain signal to the amplifier 126, the output of the amplifier 118 will be RFO−LFO+K$\phi$. As in the embodiment depicted in FIG. 7A the output of the amplifier 118 is supplied to the summing junction 119 where it is combined with the feedback signal FB. The output of the junction 119 goes to the switch 123 as in the embodiment depicted in FIG. 7A.

As mentioned at the beginning of this application, this embodiment is somewhat less advantageous than the multicoil arrangement depicted in FIG. 7A because this embodiment is overly sensitive to variations in the straightness of the buried wire. A slight wiggle in the wire is greatly magnified and causes a spurious error signal. These effects can be reduced somewhat by using a long direction sensing coil 125 and by only using the system on a vehicle with a relatively small wheel base. This has the effect of reducing the projection distance $D_p$ with the consequency that variation in the straightness of the buried wire are not magnified as greatly. This is apparent from the fact that the constant K is actually equal to ($D_p$/A). Thus any reduction in $D_p$ will also reduce the effect of any variations in the straightness of the buried wire.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. An improved, self-guided vehicle of the type which automatically follows an externally defined path in a forward direction and which has at least one ground engaging steerable wheel, sensor means mounted on the vehicle for generating a position error signal representative of the position of the vehicle with respect to the path, steering actuator means attached to the ground engaging steering wheel for steering the vehicle in response to a steering control signal to the steering actuator means, and steering circuit means supplied with the position error signal for generating a first steering control signal for the steering actuator means to cause the steering actuator means to automatically steer the vehicle along the external path, wherein the improvement comprises:

sensor means for generating the position error signal relative to a virtual sense point to the rear of the vehicle to guide the vehicle when it travels in a backward direction along the path.

2. An improved self-guided vehicle as recited in claim 1 wherein the path is defined by a buried, energized wire and wherein the sensor means comprise a pair of forward sensor coils and a pair of reverse sensor coils with the terms forward and rear taken in the sense of the direction of forward vehicle travel, each of the pairs of coils being mounted on the vehicle so as to normally straddle the path and each pair of the coils producing an output signal representative of the difference of the outputs of the coils of each pair, and means for generating the position error signal (V) with respect to the virtual sense point according to the formula:

$$V = (1+K)R - KF$$

where
R = difference of outputs of the rear pair of sensor coils;
F = difference of outputs of the forward pair of sensor coils; and
K = constant = ratio of the distance between the rear pair of coils and the virtual sense point to the distance between the rear and forward pairs of coils.

3. An improved self-guided vehicle as recited in claim 1 wherein the path is defined by a buried, energized wire and wherein the sensor means comprise right (R) and left (L) error coils mounted on the vehicle on opposite sides of the path and a direction sensing coil for sensing the angle the vehicle makes with respect to the wire, the direction sensing coil being aligned with the wire so that its output ($\phi$) is proportional to the tangent of the angle made with the wire for small angles, and means for generating the position error signal (V) with respect to the virtual sense point according to the formula $$V = L - R + K\phi$$

where
- $K$ is a constant determined in part by the ratio of the distance between the direction sensing coil and the virtual sense point to the maximum output of the direction sensing coil
- $L$ = output of left error coil
- $R$ = output of right error coil
- $\phi$ = output of the direction sensing coil.

4. An improved self-guided vehicle as recited in claim 1 further comprising
   enabling logic means supplied with the sensor signal for producing an enabling output signal when the vehicle is being manually steered toward the external path and has crossed it, or passed within a predetermined distance of it, and thereafter is moving away from the external path, and
   switching means supplied with the enabling output signal to supply the first steering control signal to the steering actuator means only after the enabling output signal is generated, whereby the vehicle will become automatically guided along the external path only after it has been manually steered across or just up to the external path and is starting to move away from it.

5. An improved self-guided vehicle as recited in claim 4 wherein the external path is defined by an energized guide wire and the improvement to the vehicle further comprises:
   coil means within the sensor means and straddling the wire to produce output signals proportional to the vehicle's lateral distance from both sides of the wire, the coil means including means for producing an error signal from the difference of the coil means output signals, and
   means within the enabling logic means for triggering in part the enabling output signal when the arithmetic signs of the slope and polarity of the error signal are equal, thereby indicating that the vehicle is moving away from the wire.

6. An improved self-guided vehicle as recited in claim 5 wherein the coil means further include means for producing a reference signal from the sum of the coil means output signals and the enabling logic means include means for sensing when the reference signal reaches a predetermined magnitude and for thereafter generating a threshold signal which triggers in part the enabling logic means to produce the enabling output signal.

7. An improved self-guided vehicle as recited in claim 6 wherein the enabling logic means will continue to produce the enabling output signal when once triggered provided that the threshold signal continues to be generated.

8. An improved self-guided vehicle as recited in claim 5 wherein the coil means comprise at least a pair of sensing coils on opposite sides of the wire and a multilayered assembly for interconnecting the coils and for mounting the coils horizontally, the multilayered assembly including a printed circuit board, a sheet of insulating material, a mu metal strip and a strip of ferrous material, the printed circuit board having a metallic circuit printed thereon and the coils having leads attached to the printed circuit board and interconnected by the printed circuit, the mu metal strip providing a low reluctance return path for lines of magnetic flux generated by the energized wire and passing through the coils.

9. An improved self-guided vehicle as recited in claim 4 wherein the steering actuator means include an electric motor for positioning the ground engaging steering wheel and the steering circuit means include
   an electric tachometer for sensing the voltage drop across the motor and the electrical current flowing through it for generating a tachometer feedback signal representative of the response of the motor to the steering control signal, and
   means for subtracting the tachometer feedback signal from the steering control signal before it is supplied to the motor.

10. An improved, self-guided vehicle of the type which automatically follows a path defined by a buried, energized wire and which has at least one ground engaging steerable wheel, and a pair of wheels on a fixed axle, sensor means mounted on the vehicle for generating a sensor signal representative of both the lateral position of the vehicle with respect to the wire and the inclination of direction of vehicle travel with respect to the wire, steering actuator means attached to the ground engaging steering wheel for steering the vehicle in response to a steering control signal to the steering actuator means, and steering circuit means supplied with the sensor signal for generating a first steering control signal for the steering actuator means to cause the steering actuator means to automatically steer the vehicle along the wire path, wherein the improvement comprises:
   the sensor means is mounted on the vehicle between the steerable wheel and the fixed axle and guides the vehicle along the wire path when the vehicle is traveling in a direction such that the fixed axle wheels precede the steerable wheel, the sensor means including a pair of first sensor coils and a pair of second sensor coils, the first sensor coils being mounted closest to the fixed axle wheels and each of the pairs of coils being mounted on the vehicle so as to normally straddle the wire path and each pair of the coils producing an output signal representative of the difference of the outputs of the coils of each pair, and means for generating the position error signal (V) with respect to a virtual sense point, located beyond the fixed axle wheels and in the direction of vehicle travel, according to the formula:

$$V = (1+K)A - KB$$

where
- $A$ = difference of outputs of first pair of sensor coils;
- $B$ = difference of outputs of the second pair of sensor coils; and
- $K$ = constant = ratio of distance between the first pair of sensor coils and the virtual sense point to the distance between the first and second pairs of coils.

* * * * *